(12) United States Patent
Hsieh (10) Patent No.: US 7,392,973 B1
(45) Date of Patent: Jul. 1, 2008

(54) STRAP TENSIONER

(76) Inventor: Wen-Hsiang Hsieh, No. 54, Chang-Ma Road, Changhua City (TW)

( * ) Notice: Subject to any disclaimer, the term of this patent is extended or adjusted under 35 U.S.C. 154(b) by 0 days.

(21) Appl. No.: 11/773,770

(22) Filed: Jul. 5, 2007

(51) Int. Cl.
*B66D 3/00* (2006.01)
(52) U.S. Cl. ............... 254/218; 254/239; 254/243; 24/69 ST; 24/71 ST
(58) Field of Classification Search ............ 254/217, 254/218, 238, 239, 243; 24/70 ST, 69 ST, 24/69 CT, 71 ST
See application file for complete search history.

(56) References Cited

U.S. PATENT DOCUMENTS

| 4,227,286 | A | * | 10/1980 | Holmberg | 24/68 CD |
|---|---|---|---|---|---|
| 4,235,420 | A | * | 11/1980 | Ross et al. | 254/218 |
| 4,796,336 | A | * | 1/1989 | Scully | 24/68 CD |
| 5,904,341 | A | * | 5/1999 | Norrby | 254/243 |
| 5,957,433 | A | * | 9/1999 | Fujikawa et al. | 254/371 |
| 6,457,701 | B1 | * | 10/2002 | Huang | 254/217 |
| 6,648,301 | B2 | * | 11/2003 | Lee | 254/218 |
| 7,216,849 | B2 | * | 5/2007 | Tremblay | 254/220 |
| 2006/0180800 | A1 | * | 8/2006 | Tremblay | 254/229 |

\* cited by examiner

*Primary Examiner*—Emmanuel M Maroelo
(74) *Attorney, Agent, or Firm*—Banner & Witcoff, Ltd.

(57) ABSTRACT

A tensioning device for a fastening strap comprises a base and a lever; a spindle pivotally connecting the lever to the base and adapted to permit the strap to be wound therearound, the spindle having a first spindle component and a second spindle component which together define therebetween a gap adapted for passage of a portion of the strap; and at least one ratchet wheel disposed around the spindle for rotating in concert with the spindle and driven by the lever to rotate the spindle, wherein the gap has a variable width that can be narrowed to cause the first and second spindle components to clamp the strap.

11 Claims, 7 Drawing Sheets

STRAP TENSIONER

BACKGROUND OF THE INVENTION

1. Field of the Invention

The present invention relates generally to fastening devices, more particularly to ratchet buckles, strap tensioners, cargo restraining devices and the like used for tightening and tensioning a fastening strap for securing and restraining cargo loads or other objects.

2. Description of the Related Art

Figure 1:
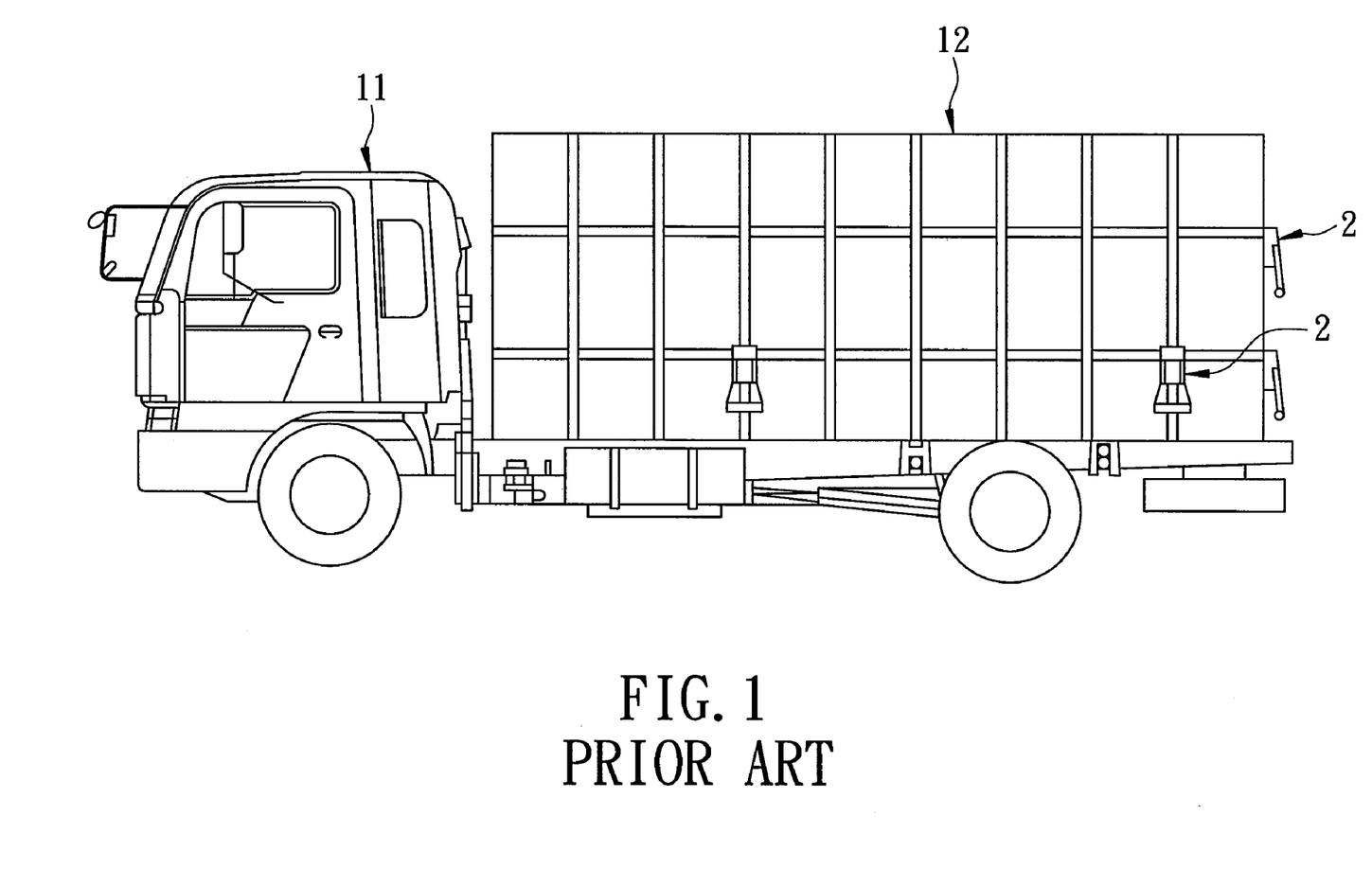
FIG. 1 shows the manner in which a conventional fastening device is used to secure cargo loads or articles on a transport vehicle.
Figure 2:
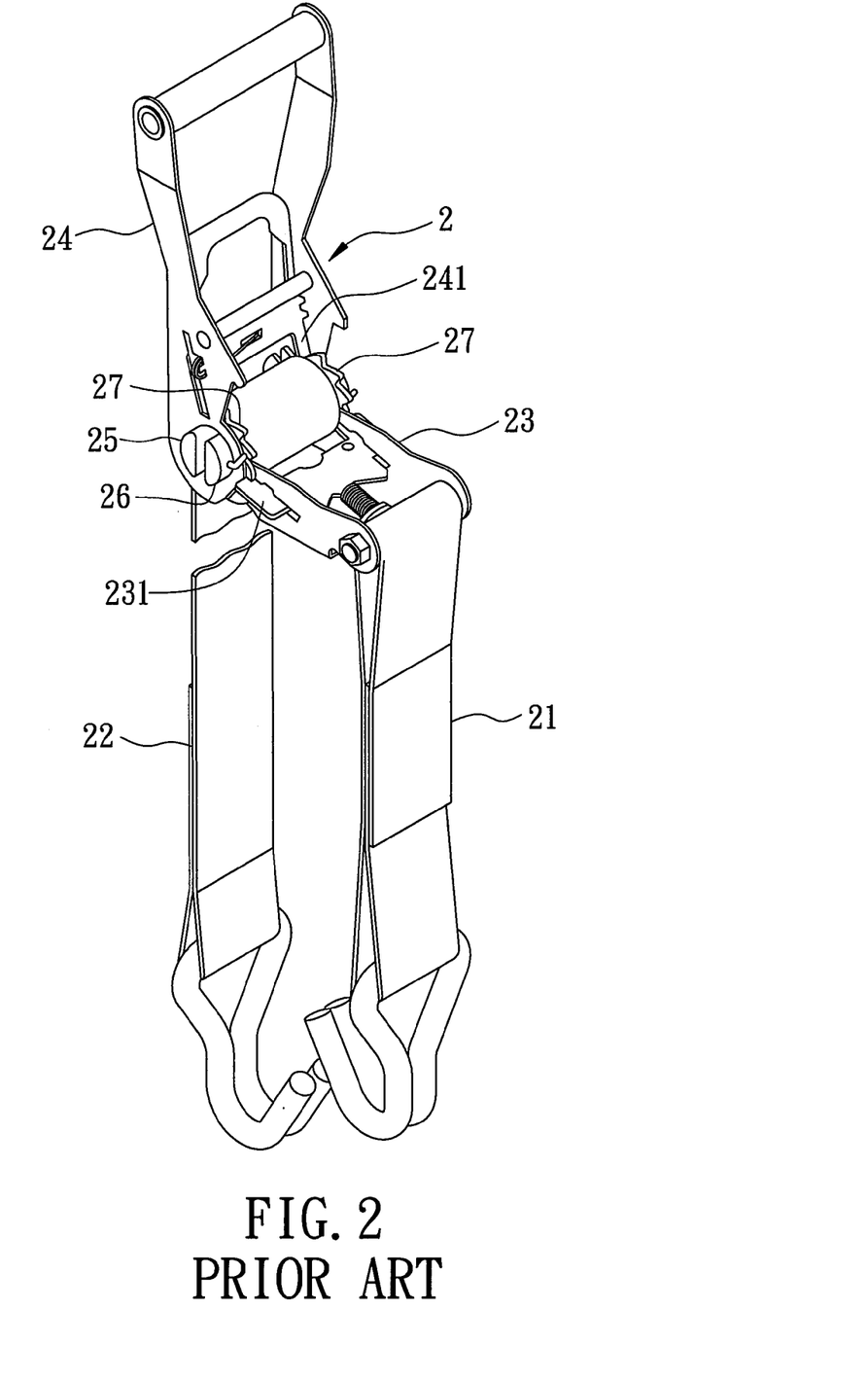
FIG. 2 is a perspective view showing the conventional fastening device with a tightening and tensioning mechanism for a lashing strap.
Figure 3:
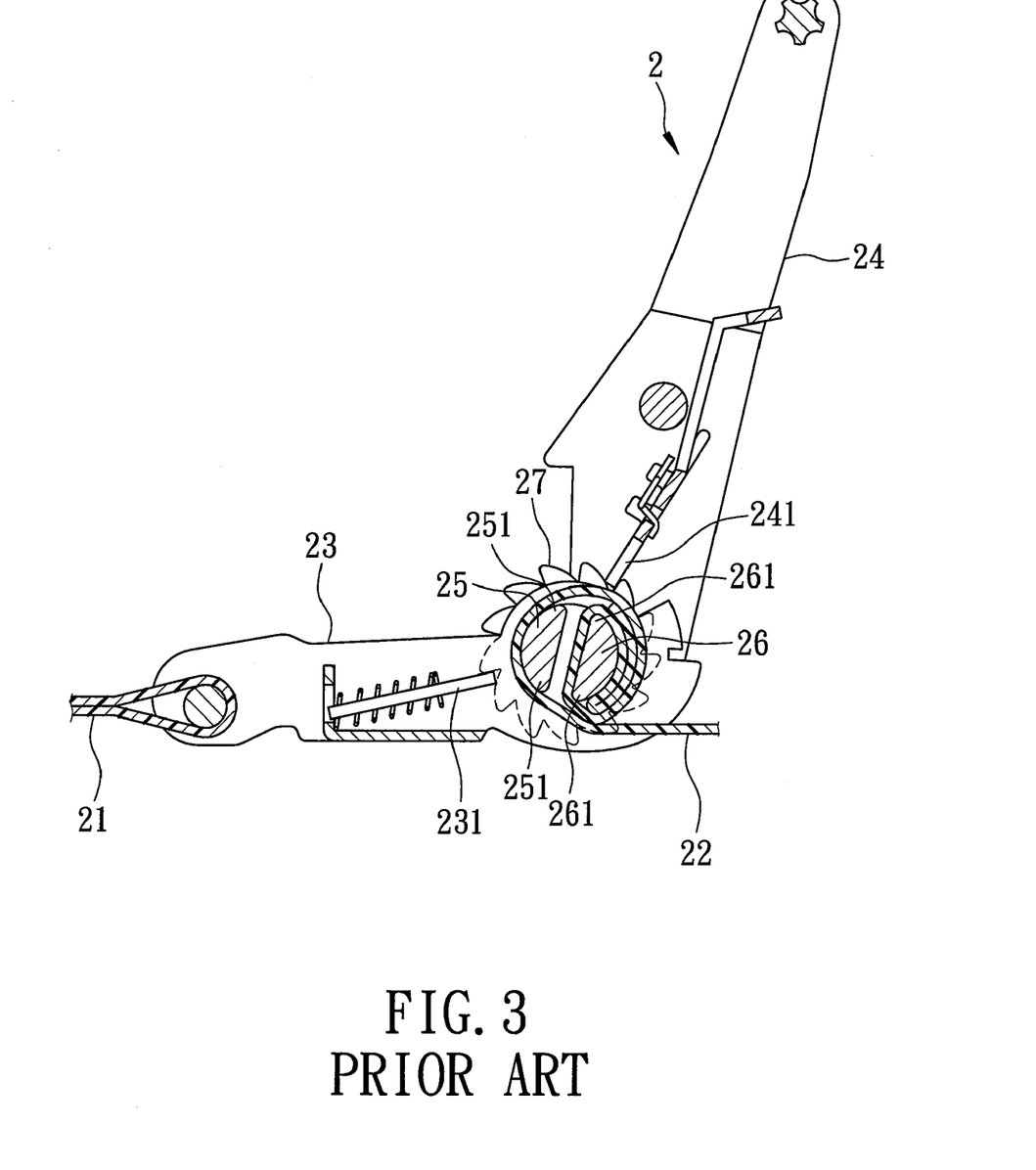
FIG. 3 is a sectional view showing the conventional fastening device shown in FIG. 2.

FIG. 1 shows a transport vehicle 11 carrying cargos or articles 12 secured by a plurality of fastening devices 2. The articles 12 being transported, normally stacked side by side and one above the other, are restrained from undesired movement or toppling down by the fastening devices 12. As shown in FIGS. 2 and 3, the fastening device 2 mainly comprises a lead strap 21, a lashing strap 22, a tightening and tensioning mechanism comprising a base 23 to which the lead strap 21 is attached and a lever 24 pivotally connected to the base 23 by a spindle formed by a pair of spindle components 25,26, and a pair of ratchet wheels 27 disposed around both ends of the spindle and rotatable in concert with the spindle components 25,26 when driven. A free end of the lashing strap 22 is attached to the spindle so as to be wound therearound. The ratchet wheels 27 each have a central hole which is separated into two semicircular openings, and the spindle components 25,26 are of semicircular cross section corresponding to the shape of the openings. The spindle components 25,26 are inserted into said openings, respectively, thus defining therebetween a gap for passage of a portion of the lashing strap 22. The lever 24 has a ratchet drive plate 241 for engaging and driving the ratchet wheels 27 to rotate in the winding direction of the lashing strap 22 when the lever 24 is pulled away from the base 24, and which is resiliently releasable from the ratchet wheels 27 when the lever 24 is pushed forward to the base 23 in the unwinding (reverse) direction, and the base 23 has a stop 231 that prevents the ratchet wheels 27 from rotating in the unwinding direction of the lashing strap 22 and that may be resiliently released from the ratchet wheels 27 when the ratchet wheels 27 are rotated in the winding direction. By such construction, the spindle components 25,26 can be rotated step by step to thereby incrementally shorten and tension the lashing strap 22.

In use, the articles 12 are preliminarily fastened with the lead and lashing straps 21,22, and then the lever 24 is repeatedly pulled back and forth, which causes the ratchet wheels 27 to drive the spindle components 25,26 to rotate in the winding direction of the lashing strap 22 thus incrementally shortening the length of the lashing strap 22. Accordingly, the lead and lashing straps 21,22 maintain the fastening tension and will not be loosened by the swaying motion of the transport vehicle, such that the objective of tightly fastening and restraining the articles 12 is achieved.

However, because the spindle components 25,26 are spaced-apart at a fixed distance due to the constraints of the ratchet wheels 27, the final angle/position of the spindle components 25,26, after being rotated in the winding direction to shorten the length of the lashing strap 22 for tensioning the articles 12, is unpredictable and usually only one of the spindle components 25,26 (i.e., the spindle component 26) bears the stress exerted along the tensioning direction. Even if both spindle components 25,26 bear the stress, the areas subjected to the stress are confined to the two edges 251,261 of the spindle components 25,26, respectively. Such stress concentration causes insufficiency in structural strength and easily predisposes the affected parts to twisting and deformation and even so far as causing fracture or breakage.

SUMMARY OF THE INVENTION

Therefore, in the light of the above-described disadvantages encountered in the prior art, a main object of the present invention is to provide a tensioning device for a fastening strap in which the stress generated from the tensioned cargo loads or objects can be dispersed thereby enhancing the structural strength of the device.

Accordingly, the present invention provides a tensioning device for a fastening strap which comprises a base and a lever; a spindle pivotally connecting the lever to the base and adapted to permit the strap to be wound therearound, the spindle having a first spindle component and a second spindle component which together define therebetween a gap adapted for passage of a portion of the strap; at least one ratchet wheel disposed around the spindle for rotating in concert with the spindle and driven by the lever to rotate the spindle, wherein the gap has a variable width that can be narrowed to cause the spindle components to clamp the strap.

BRIEF DESCRIPTION OF THE DRAWINGS

Other features and advantages of the present invention will become apparent in the following detailed description of a preferred embodiment with reference to the accompanying drawings, in which.

DETAILED DESCRIPTION OF THE PREFERRED EMBODIMENTS

Figure 4:
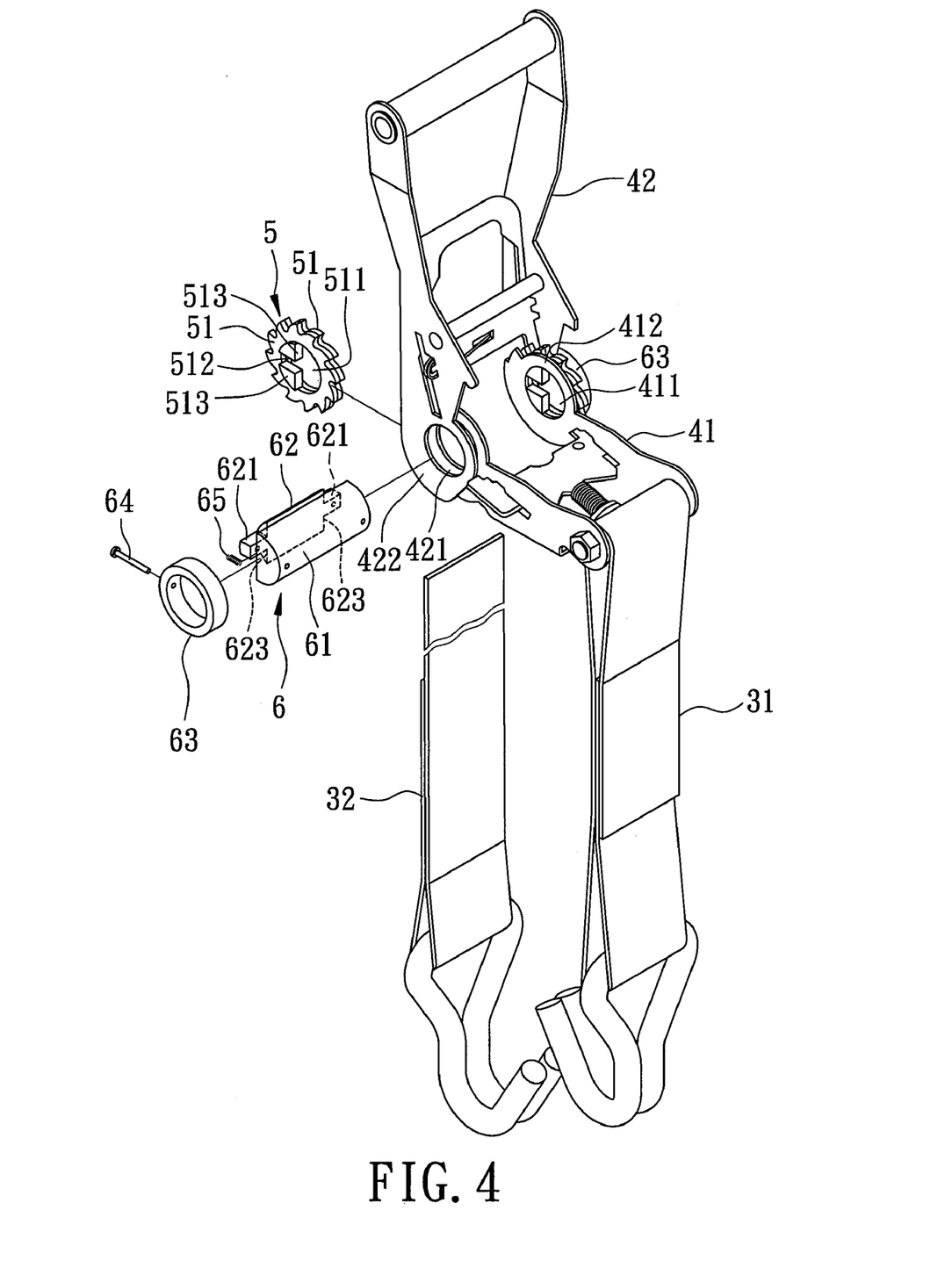
FIG. 4 is an exploded, perspective view of a tensioning device for a fastening strap according to a preferred embodiment of the present invention.
Figure 5:
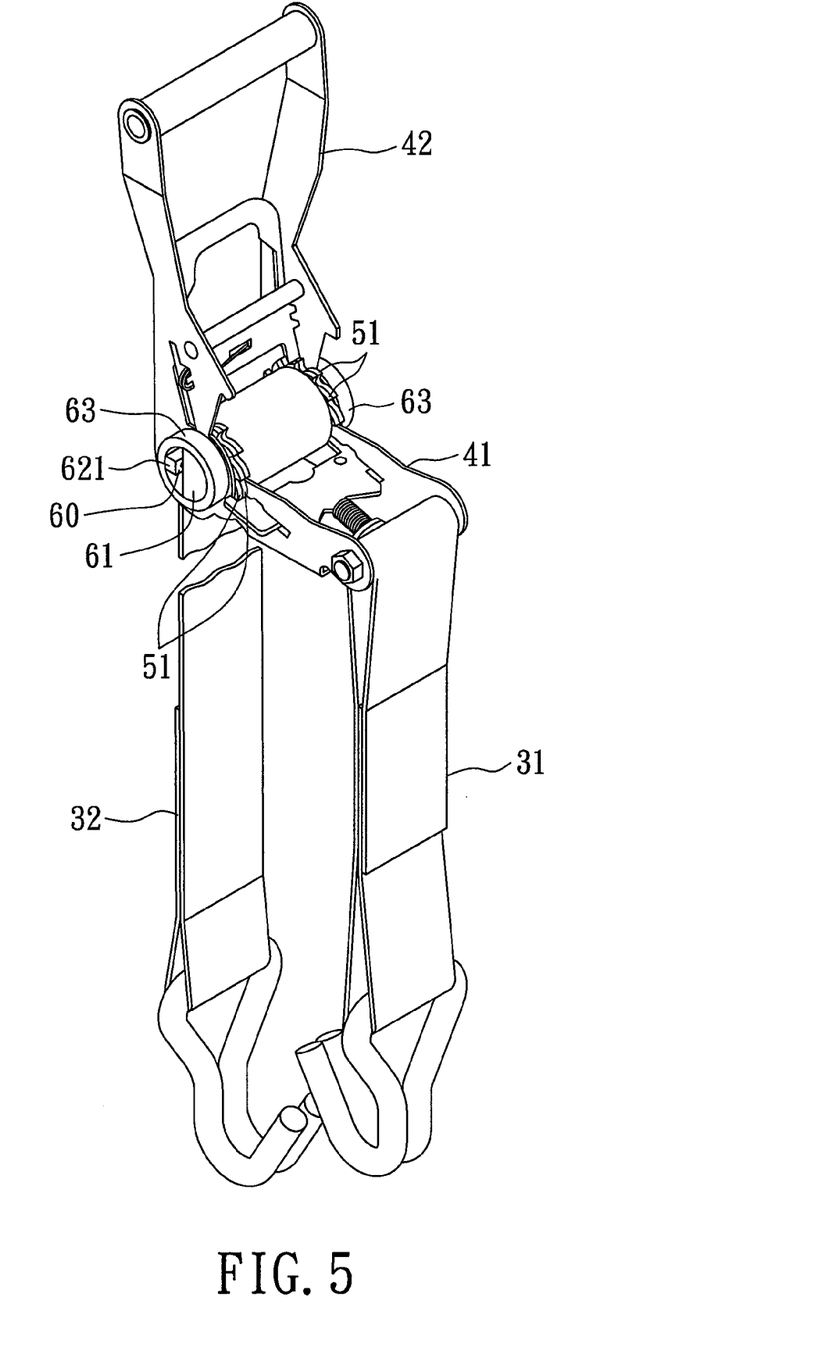
FIG. 5 is a perspective view of the preferred embodiment in the assembled form.

With reference to FIGS. 4 and 5, a tensioning device for a fastening strap according to a preferred embodiment of the present invention generally comprises a base 41 to which a first, or lead, strap 31 is attached and a lever 42 pivotally connected to the base 41 by a spindle 6, around which a free end of a second, or lashing, strap 32, is wound. The base 41 has a pair of lugs 412 each formed with a base spindle hole 411, and the lever 42 has a pair of ears 422 aligned with said lugs 412, respectively, each being formed with a lever spindle hole 421. Two ratchet wheels 5 are disposed around the spindle 6, each of which is between one the base spindle holes 411 and one of the lever spindle holes 421. The spindle 6 extends into the base and lever spindle holes 411,421 and the ratchet wheels 5. The ratchet wheels 5 rotate in concert with the spindle 6 when driven by the lever 42 to rotate the spindle 6.

The spindle 6 includes a first spindle component 61 and a second spindle component 62 both of which, in the illustrated embodiment, have a semicircular cross section, the cross section of the first spindle component 61 being larger than that of the second spindle component 62. The second spindle component 62 is formed with two shoulders 623 and two constricted end sections 621 respectively extending from the shoulders 623 and each having a rectangular cross section. Each ratchet wheel 5 has a first opening 511 that is segmental and substantially corresponds to the cross section of the first spindle component 61, for receiving immovably therein the first spindle component 61, and a second opening 512 in communication with the first opening 511 for receiving movably the second spindle component 62, specifically, one of the constricted end sections 621. The second opening 512 has an oblong shape longer than the rectangular cross section of the respective constricted end section 621 of the second spindle component 62 and extending in a radial direction, the first opening 511 extending in a chordal direction perpendicular to the radial direction. Each constricted end section 621 of the second spindle component 62 is inserted into the respective base and lever spindle holes 411,421 and positioned in the second opening 512 of the respective ratchet wheel 5. The second spindle component 62 is displaceable within the respective second opening 512 of the ratchet wheels 5. Accordingly, the second spindle component 62 is movable toward the first spindle component 61 within the confines of the second openings 512. Each ratchet wheel 5 further has two protrusions 513 that confine the second opening 512 and that extends into the respective base or lever spindle holes 411,421. In this embodiment, each protrusion 513 extends into the respective lever spindle hole 421 and is slidable along an edge bounding the respective lever spindle hole 421 when the ratchet wheels 5 rotate, so that the ratchet wheels 5 are prevented from displacing in a direction transverse to the axis of the spindle 6. Preferably, each ratchet wheel 5 is made up of two ratchet plates 51.

Two elastic elements 65 (only one is shown) are disposed between the first and second spindle components 61,62 to bias the first and second spindle components 61,62 to move away from each other, thereby forming a gap 60 therebetween for passage of a portion of the lashing strap 32. Two sleeves 63 are disposed around the first spindle component 61 and the constricted end sections 621 of the second spindle component 62. There are two pins 64 (only one is shown), each being inserted into the first spindle component 61 and the respective constricted end section 621 and extending through the gap 60 and into the respective sleeve 63. Each elastic element 65 is coiled around the respective pin 64. By their restoring force, the elastic elements 65 urge the first and second spindle components 61,62 to separate in the absence of external force applied thereto.

The gap 60 defined between the first and second spindle components 61,62 has a variable width that can be narrowed to cause the spindle components 61,62 to clamp the lashing strap 32, as will be explained in more detail below.

When the present invention is used to secure a cargo load or object, the lead strap 31 and the lashing strap 32 are preliminarily fastened over the load as similarly shown in FIG. 1. The lever 42 is then repeatedly raised and lowered relative to the base 41 to drive the ratchet wheels 5 to rotate the spindle 6 in the winding direction and to wind the lashing strap 32 around the spindle 6, thereby incrementally shortening the length of the lashing strap 32 and incrementally tensioning and tightening the lashing strap 32. The lead strap 31 and lashing strap 32 are retained in a tensioned condition that restrains the cargo load even in the swaying motion of the transport vehicle, so that the objective of tightly securing a load is achieved.

Figure 6:
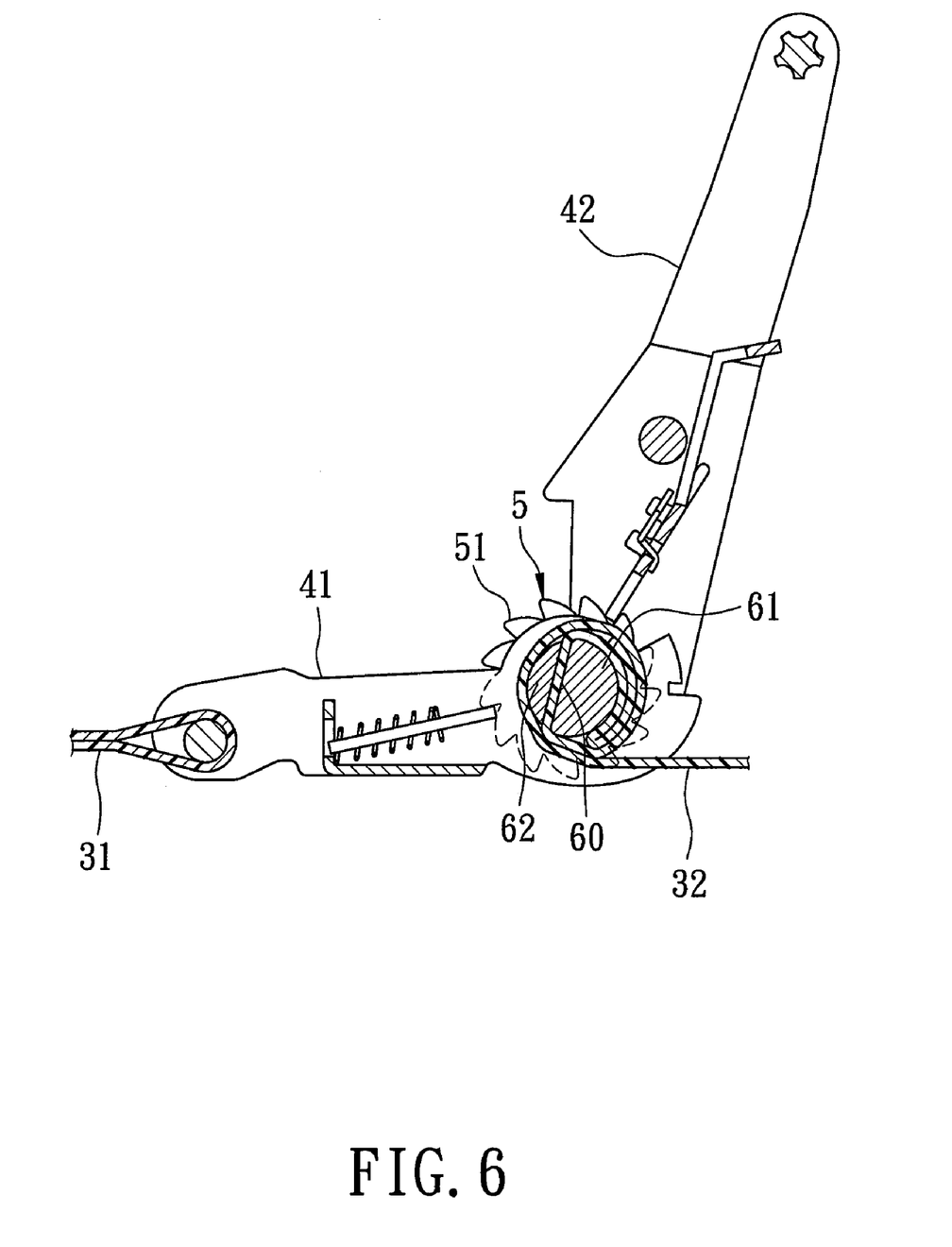
FIG. 6 is a partially sectioned view showing the spindle of the tensioning device rotated in an unwinding direction to loosen the fastening strap.
Figure 7:
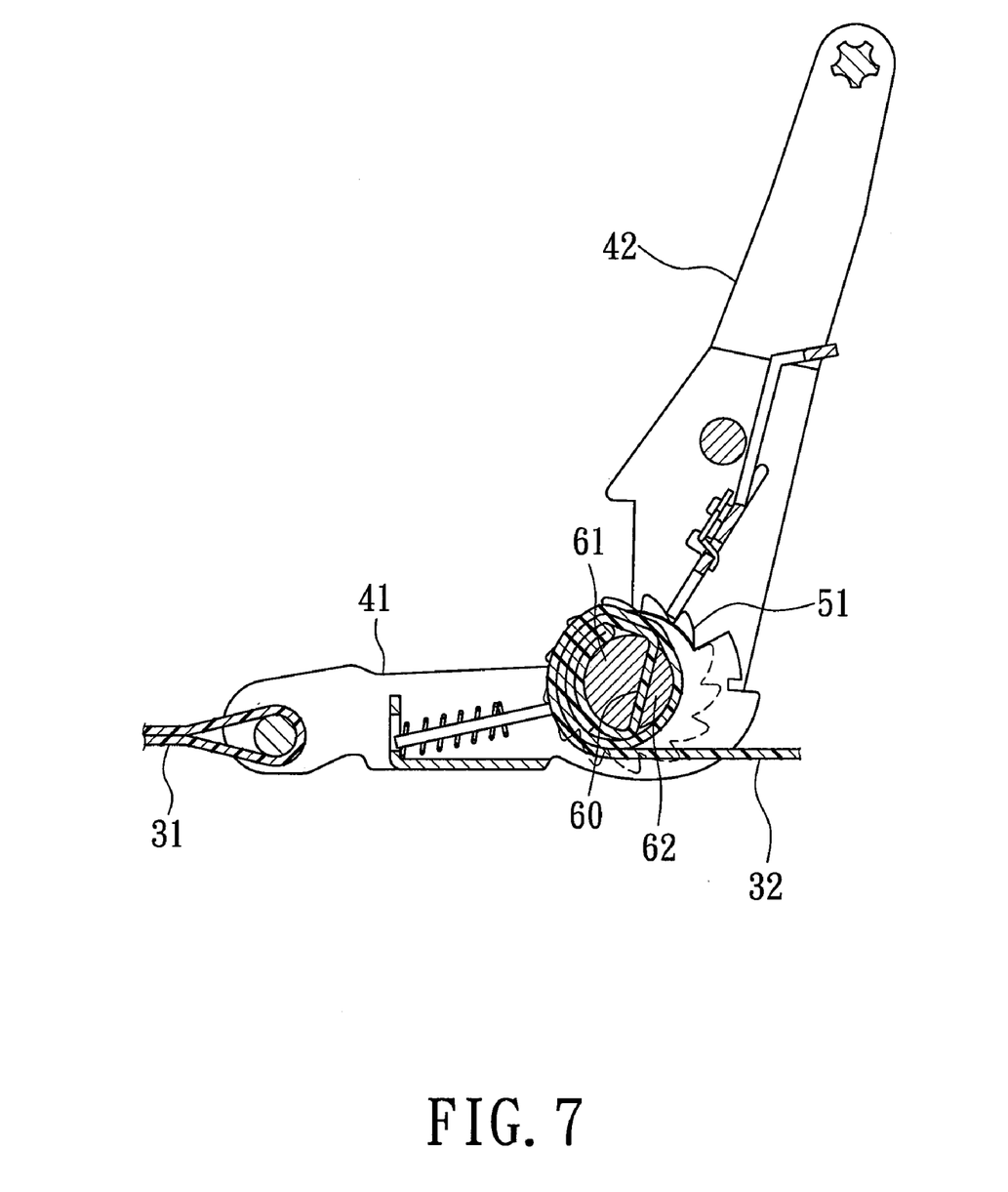
FIG. 7 is the same view as FIG. 6 but showing the spindle rotated in a winding direction to tighten the fastening strap.

Referring to FIGS. 4, 6 and 7, as the lashing strap 32 is wound around both the first and second spindle components 61,62 by actuation of the lever 42, the second spindle component 62, with the constricted end sections 621, is urged to overcome the biasing force of the elastic elements 65 within the second openings 512 of the ratchet wheels 5 to move toward the first spindle component 61 in the axial direction of the pins 64, thus narrowing and closing the gap 60 and clamping the portion of lashing strap 32 between the first and second spindle components 61,62. The spindle components 61,62 thus act as one unitary body.

When the first spindle component 61, after tensioning the lashing strap 32, is subjected to stress exerted in the tensioning direction, since the cross section of the first spindle component 61 is larger than that of the second spindle component 62, the first spindle component 61 which is more sturdy in its overall structure provides sufficient structural strength to bear the pulling force of the lashing strap 32. When the second spindle component 62 is subjected to stress exerted in the tensioning direction, since the second spindle component 62 moves to the first spindle component 61 and becomes integrated with the first spindle component 61 due to the tensioned lashing strap 32 being wound around the two, the first and second spindle components 61,62 becomes a unitary body with increased structural strength to withstand the tensional forces. In addition, the unitary body provides an increased contact area between the spindle 6 and the lashing strap 32 so that the tensional forces are spread over and shared by the first and second spindle components 61,62.

It can be appreciated, from the description above, that the tensioning device of the present invention has the following advantages and effects:

By the construction of the gap 60 which is variable in width, the first and second spindle components 61,62 are combined closely through the tensioned lashing strap 32 thus forming a unitary body, and the acting forces exerted by the lashing strap 32 are distributed over both the first and second spindle components 61,62, such that the first and second spindle components 61,62 share the acting forces. Further, in conjunction with the different size arrangement of the first and second spindle components 61,62, the contact area of the spindle 6 to contact the lashing strap 32 is enlarged, which in turn enhance the overall structural strength of the spindle 6, thus extending the useful life of the device.

While the present invention has been described in connection with what is considered the most practical and preferred embodiment, it is understood that the present invention is not limited to the disclosed embodiment but is intended to cover various arrangements included within the spirit and scope of the broadest interpretation so as to encompass all such modifications and equivalent arrangements.

What is claimed is:

1. A tensioning device for a fastening strap, comprising:
    a base and a lever;
    a spindle pivotally connecting said lever to said base and adapted to permit the strap to be wound therearound, said spindle having a first spindle component and a second spindle component which together define therebetween a gap adapted for passage of a portion of the strap;
    at least one ratchet wheel disposed around said spindle for rotating in concert with said spindle and driven by said lever to rotate said spindle;

wherein said gap has a variable width that can be narrowed to cause said spindle components to clamp the strap.

2. The tensioning device as claimed in claim 1, wherein said spindle further has an elastic element disposed between said first and second spindle components and biasing said first and second components to move away from each other.

3. The tensioning device as claimed in claim 2, wherein said spindle further has a pin inserted into said first and second spindle components and extending through said gap, said elastic element being coiled around said pin.

4. The tensioning device as claimed in claim 3, further comprising a sleeve disposed around said first and second spindle components, said pin further extending into said sleeve.

5. The tensioning device as claimed in claim 1, wherein said first spindle component has a cross section larger than that of said second spindle component.

6. The tensioning device as claimed in claim 5, wherein said ratchet wheel has a first opening to receive immovably said first spindle component and a second opening in communication with said first opening and receiving movably said second spindle component, said second spindle component being movable toward said first spindle component along said second opening to narrow said gap.

7. The tensioning device as claimed in claim 6, wherein said base has a base spindle hole and said lever has a lever spindle hole, said ratchet wheel being disposed between said base and lever spindle holes, said first and second spindle components extending through said base and lever spindle holes and said ratchet wheel.

8. The tensioning device as claimed in claim 7, wherein said ratchet wheel further has a protrusion that extends into one of said base and lever spindle holes and slidable along an edge bounding said one of said base and lever spindle holes when said ratchet wheel rotates.

9. The tensioning device as claimed in claim 7, wherein said second spindle component has a shoulder, and a constricted end section extending from said shoulder and inserted into said base and lever spindle holes and said second opening of said ratchet wheel.

10. The tensioning device as claimed in claim 9, further comprising a sleeve extending around said constricted end section and said first spindle component and disposed at one side of said one of said base and lever spindle holes opposite to said ratchet wheel, said spindle further having a pin inserted into said sleeve, said first spindle component and said constricted end section.

11. The tensioning device as claimed in claim 6, wherein said first opening is segmental and substantially corresponds to said cross section of said first spindle component, said cross section of said constricted end section of said second spindle component being rectangular, and said second opening having an oblong shape longer than said cross section of said second spindle component.

\* \* \* \* \*